United States Patent
Zhang et al.

(10) Patent No.: US 10,576,822 B2
(45) Date of Patent: Mar. 3, 2020

(54) POWER TAKE-OFF UNIT RING GEAR SHAFT, MANUFACTURING METHOD THEREOF AND APPARATUS COMPRISING THE SAME

(71) Applicant: Georg Fischer Automotive (Kunshan) Co. Ltd., Kunshan (CN)

(72) Inventors: Jack Zhang, Kunshan (CN); Richard Zhang, Suzhou (CN); Aaron Fu, Suzhou (CN)

(73) Assignee: GF Casting Solutions Kunshan Co. Ltd., Kunshan (CN)

( * ) Notice: Subject to any disclaimer, the term of this patent is extended or adjusted under 35 U.S.C. 154(b) by 93 days.

(21) Appl. No.: 15/696,582

(22) Filed: Sep. 6, 2017

(65) Prior Publication Data

US 2018/0086203 A1     Mar. 29, 2018

(30) Foreign Application Priority Data

Sep. 29, 2016   (CN) .......................... 2016 1 0862296

(51) Int. Cl.
| | |
|---|---|
| *F16H 48/42* | (2012.01) |
| *B60K 25/06* | (2006.01) |
| *F16C 3/02* | (2006.01) |
| *F16H 57/00* | (2012.01) |
| *B60K 17/346* | (2006.01) |
| *F16H 1/14* | (2006.01) |

(52) U.S. Cl.
CPC .......... *B60K 25/06* (2013.01); *B60K 17/3462* (2013.01); *F16C 3/02* (2013.01); *F16H 48/42* (2013.01); *F16H 57/0025* (2013.01); *F16C 2361/61* (2013.01); *F16H 1/14* (2013.01)

(58) Field of Classification Search
CPC .... B60K 25/06; B60K 17/3462; B60K 17/28; F16H 2048/385; F16H 48/42; F16H 57/0025; F16H 57/0037; F16C 3/02; F16C 2361/61
USPC .......................... 74/15.86, 423, 424; 464/183
See application file for complete search history.

(56) References Cited

U.S. PATENT DOCUMENTS

| | | | | |
|---|---|---|---|---|
| 1,612,321 | A * | 12/1926 | Soderberg ................. | F16C 3/02 310/265 |
| 1,844,231 | A * | 2/1932 | Sipe ........................ | F27D 3/026 193/37 |
| 4,884,916 | A * | 12/1989 | Johnson, III ............ | F16D 1/097 403/370 |

(Continued)

FOREIGN PATENT DOCUMENTS

JP          05010321 A  *  1/1993  ............. B21K 1/063

*Primary Examiner* — Ruth Ilan
(74) *Attorney, Agent, or Firm* — Harness, Dickey & Pierce, P.L.C.

(57) ABSTRACT

A power take-off unit ring gear shaft, a method of manufacturing such a power take-off unit ring gear shaft and an apparatus comprising the power take-off unit ring gear shaft. The ring gear shaft of the invention has an annular shaft wall which surrounds a hollow inner cavity that extends throughout the entire gear shaft in an axial direction, and hollow portions are formed in the shaft wall. The invention realizes a lightweight product, helps to realize a lightweight entire vehicle, and meanwhile reduces machining areas, thus improving production efficiency of machining, reducing production cost of product, reducing labor intensity and improving productivity.

7 Claims, 4 Drawing Sheets

(56) References Cited

U.S. PATENT DOCUMENTS

| | | | | |
|---|---|---|---|---|
| 5,658,087 | A * | 8/1997 | Butkovich | B60K 17/28 |
| | | | | 403/2 |
| 6,837,819 | B2 * | 1/2005 | Foster | B60K 17/3462 |
| | | | | 475/204 |
| 8,030,821 | B2 * | 10/2011 | Ganong | F16C 3/02 |
| | | | | 29/598 |
| 8,672,800 | B2 * | 3/2014 | Nomura | F16H 57/082 |
| | | | | 475/331 |
| 8,801,368 | B2 * | 8/2014 | Noller | F16D 1/0858 |
| | | | | 415/124.1 |
| 2004/0226170 | A1 * | 11/2004 | Prucher | F16D 1/068 |
| | | | | 29/893 |
| 2009/0139368 | A1 * | 6/2009 | Mayer | F01L 1/047 |
| | | | | 74/567 |
| 2010/0283358 | A1 * | 11/2010 | Ganong | F16C 3/02 |
| | | | | 310/75 D |
| 2014/0102228 | A1 * | 4/2014 | Mayer | B60K 17/28 |
| | | | | 74/15.82 |

* cited by examiner

[Figure 1]
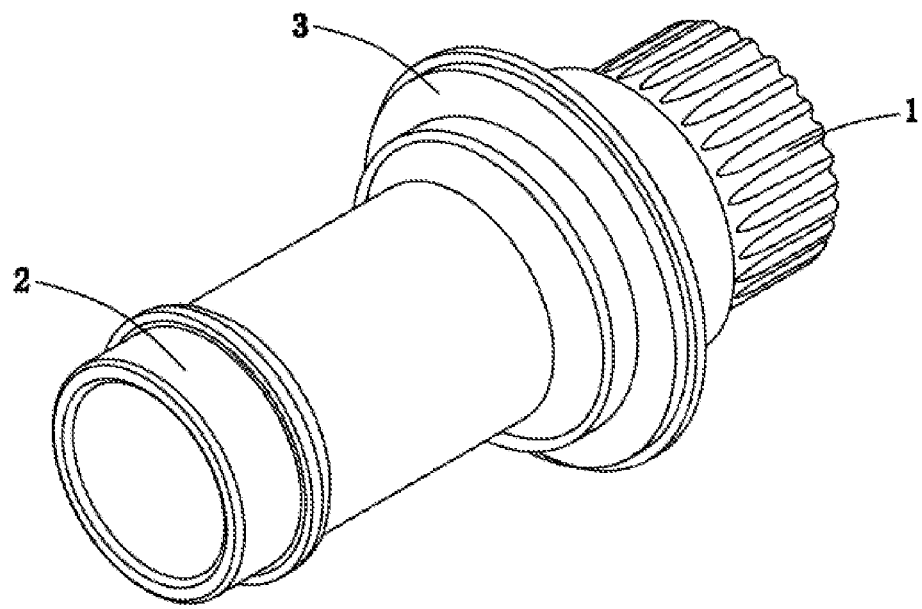
— PRIOR ART —

[Figure 2]
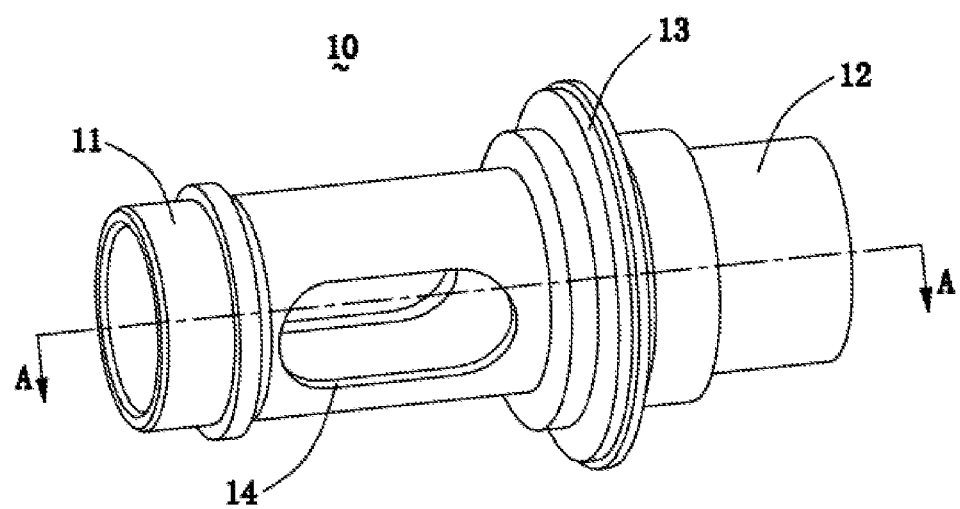

[Figure 3]
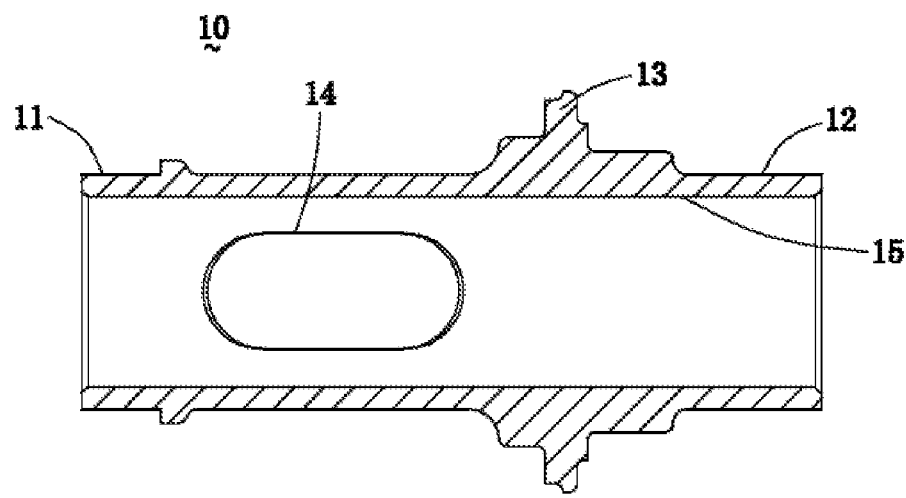
[Figure 4]
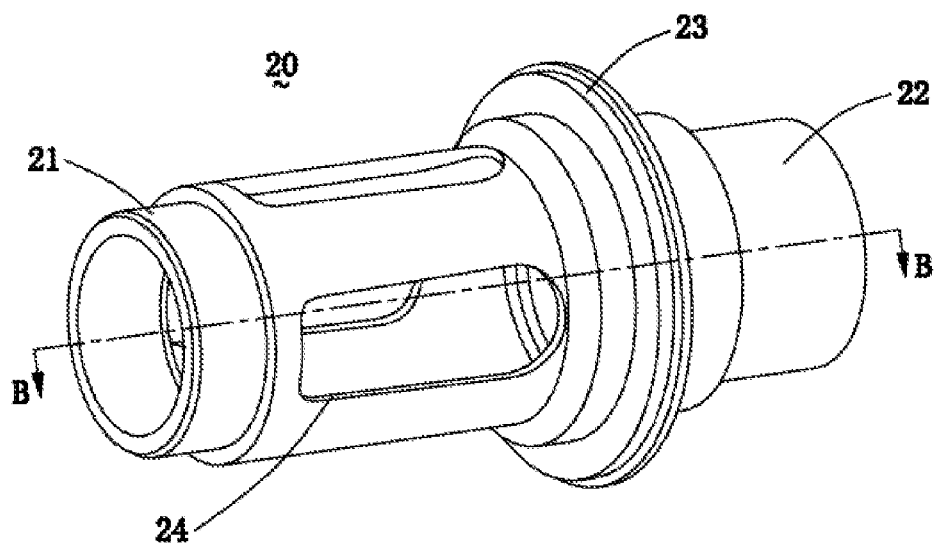

[Figure 5]
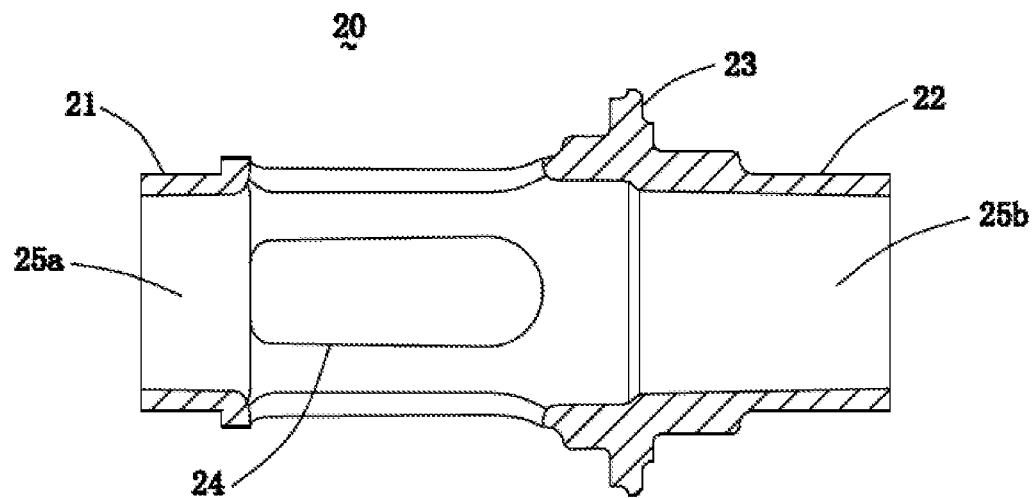
[Figure 6]
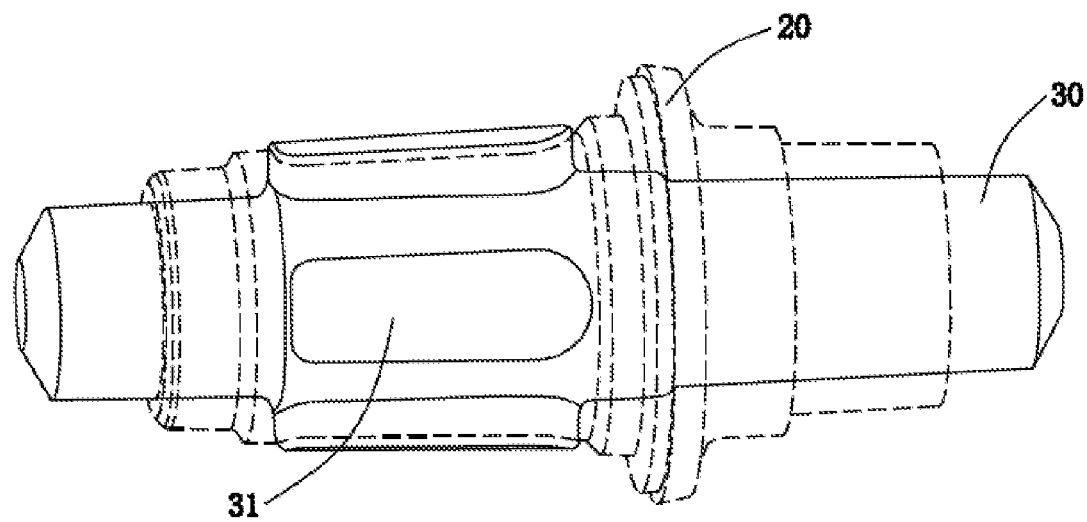

POWER TAKE-OFF UNIT RING GEAR SHAFT, MANUFACTURING METHOD THEREOF AND APPARATUS COMPRISING THE SAME

CROSS-REFERENCE TO RELATED APPLICATIONS

This application claims the benefit and priority of Chinese Patent Application No. 201610862296.7, filed Sep. 29, 2016. The entire disclosure of the above application is incorporated herein by reference.

FIELD

The invention relates to the technical field of manufacturing vehicle elements and components; specifically, the invention relates to a power take-off unit ring gear shaft of vehicle. The invention further relates to a method of manufacturing such a power take-off unit ring gear shaft and an apparatus comprising the power take-off unit ring gear shaft.

BACKGROUND

The power take-off unit (PTU) is used in a vehicle (e.g., commercial Vehicle passenger vehicle) to output the power to the outside. For example, in a four-wheel drive vehicle, the PTU is connected to a front engine and transmission so as to transmit the torque to a rear axle.

The PTU ring gear shaft is one of the important components of the PTU. FIG. 1 shows a schematic view of the PTU ring gear shaft in the prior art, wherein a right side end 1 is the input end which is connected to the transmission case via a coupling sleeve, a bearing is mounted to a left side end 2 so as to be fitted with the PTU case, and an intermediate flange 3 is connected to a bevel gear so as to transmit the power to the rear output shaft. In the prior art, the PTU ring gear shaft is designed to be a solid circular ring, which does not meet a lightweight requirement.

In the prior art, PTU ring gear shafts are mostly manufactured using machining methods. Firstly, a suitable tubing material or bar material is selected; then, the inner and outer sides of the material are cut and formed. Such a way of manufacturing has a high cost, a low utilization rate of material and a low production efficiency, thus making it not suitable for mass production. More importantly, this manufacturing method destroys metal streamline, thus greatly reducing the performances of elements.

In the prior art, there is also a method for manufacturing PTU ring gear shaft, in which a blank is produced by firstly cold-pressing precision molding and forging, and then precision machining. This method also has the defect of low utilization rate of material. Meanwhile, whether cold-pressing molding or forging, a high requirement is put on the mold; moreover, the mold has a very high cost and the service life of it is also not long, and meanwhile a large-tonnage press machine is required. The elements produced by cold-pressing and by forging have a poor plasticity and impact ductility as well as a large residual stress, which will result in a deformation of elements and a reduction in the resistance to stress corrosion.

SUMMARY

An aspect of the invention is to provide a power take-off unit ring gear shaft and a method of manufacturing the same which can overcome the above defects in the prior art.

Further, an aspect of the invention is also to provide an apparatus which comprises the power take-off unit ring gear shaft.

In order to achieve the above goals, a first aspect of the invention provides a power take-off unit ring gear shaft, wherein the gear shaft has an annular shaft wall which surrounds a hollow inner cavity that extends throughout the entire gear shaft in an axial direction, and hollow portions are formed in the shaft wall.

Optionally, in the above described gear shaft, the hollow portions are evenly distributed in the circumferential direction in the shaft wall.

Optionally, in the above described gear shaft, the gear shaft has a support end that is adapted to be mounted to a power take-off unit case via a bearing, and an intermediate flange that is adapted to fix a bevel gear, wherein the hollow portions are located between the support end and the intermediate flange.

Optionally, in the above described gear shaft, the inner cavity is a step-like mold cavity.

Optionally, in the above described gear shaft, the gear shaft has an input end that is opposite to the support end, and the thickness of the shaft wall at the input end is larger than that of the shaft wall at the side of the support end.

Optionally, in the above described gear shaft, the gear shaft is made of spheroidal graphite iron material.

Optionally, in the above described gear shaft, the spheroidal graphite iron material is QT700-10.

In order to achieve the above objects, a second aspect of the invention provides an apparatus comprising any of the above described gear shafts according to the first aspect.

Optionally, the above described apparatus is a vehicle power take-off unit or a vehicle.

In order to achieve the above goals, a third aspect of the invention provides a method for manufacturing any of the above described gear shafts according to the first aspect, wherein the method comprises:

step A: using a sand mold casting process to cast a blank of the gear shaft, wherein the blank has the inner cavity and the hollow portions; and step B: machining an outer shape of the blank so as to form the gear shaft.

The invention realizes a lightweight product, helps to realize a lightweight entire vehicle, and meanwhile reduces machining areas, thus improving production efficiency of machining, reducing production cost of product, reducing labor intensity and improving productivity.

BRIEF DESCRIPTION OF THE DRAWINGS

The disclosure of the invention will become more apparent with reference to the accompanying drawings. It should be understood that the drawings are merely provided for illustrative purpose, and are not intended to limit the scope of protection of the invention, wherein:

FIG. 1 is a schematic view of the vehicle power take-off unit ring gear shaft in the prior art;

FIG. 2 is a schematic perspective view of the ring gear shaft according to an embodiment of the invention;

FIG. 3 is a A-A sectional view of the ring gear shaft in FIG. 2;

FIG. 4 is a schematic perspective view of the ring gear shaft according to another embodiment of the invention;

FIG. 5 is a B-B sectional view of the ring gear shaft in FIG. 4; and

FIG. 6 shows a schematic state in which the ring gear shaft in FIG. 4 is on a casting core.

DETAILED DESCRIPTION OF THE PREFERRED EMBODIMENTS

Specific embodiments of the invention will be described below with reference to the accompanying drawings, in which identical or similar technical features are denoted by identical reference signs.

First Embodiment

FIG. 2 is a schematic perspective view of the ring gear shaft according to a first embodiment of the invention, and FIG. 3 is a A-A sectional view of the ring gear shaft.

As shown, the power take-off unit ring gear shaft 10 has an annular shaft wall, the cross sections of which at various axial positions are circular rings having identical or different sizes. The shaft wall can comprise a support end 11, an input end 12, an intermediate flange 13 or the like that are integrally formed with the shaft wall, and the ways of forming these components comprise but are not limited to machining, press molding, forging and/or casting, etc. As can be seen from the drawings, the shaft wall surrounds a hollow inner cavity 15 which extends throughout the entire gear shaft 10 in an axial direction, and additional shafts may also extend inside the cavity. Two hollow portions 14 are illustratively formed in the shaft wall.

The support end 11 of the gear shaft 10 is adapted to be mounted to a power take-off unit case on the vehicle via a bearing, whereby the gear shaft 10 can rotate inside the power take-off unit. An end of the gear shaft 10 which is opposite to the support end 11 is the input end 12 which is used for receiving power from the transmission box. The intermediate flange 13 which is adapted to fix a bevel gear (not shown) is located between the support end 11 and the input end 12. The bevel gear can output the received power to a rear axle of the vehicle. It can be seen that power is transmitted in a sequence of the transmission box—the input end 12—the intermediate flange 13—the bevel gear—the vehicle rear axle, and the support end 11 serves to support and position and does not bear a very high torque.

According to the illustrated embodiment, hollow portions 14 having an oblong shape can be formed in the shaft wall. The hollow portions 14 are preferably evenly distributed in the circumferential direction in the shaft wall. It can be conceived that under the premise the performance requirements on the ring gear shaft are met, providing these hollow portions in the shaft wall is advantageous for structure optimization, thus realizing a lightweight product. Since a very high torque is not borne between the support end 11 and the intermediate flange 13, the hollow portions 14 are preferably located between the support end and the intermediate flange. If permitted by performance, hollow portions may be also formed at the input end 12 or other positions. It can be understood that in other embodiments, in case that the performance of the ring gear shaft 10 is ensured, the number, shape and arrangement of the hollow portions can be changed. Those skilled in the art will understand that whether the performance design of product meets requirements of working conditions can be verified by finite element calculation.

It can be seen from FIG. 3 that in this embodiment, the inner cavity 15 of the shaft wall of the ring gear shaft 10 is of a smooth column shape, and the thicknesses of the shaft wall at the support end 11 and the input end 12 are the same. The inner cavity of the shaft wall can be formed by casting or by machining (without being limited thereto), etc. The ring gear shaft 10 in this embodiment can be formed by cutting out the hollow portions 14 in a prior art ring gear shaft having a solid circular ring structure.

More preferably, the ring gear shaft 10 in this embodiment can be manufactured by casting using a spheroidal graphite iron material. For example, the spheroidal graphite iron material can be QT700-10. Using this spheroidal graphite iron material greatly improves the reliability of casting the ring gear shaft. It can be known that in this casting method, a blank of the ring gear shaft can be firstly cast using a sand mold casting process so that the blank has an inner cavity and hollow portions, and then the outer shape of the blank can be machined so that the gear shaft is formed.

Second Embodiment

FIG. 4 is a schematic perspective view of the ring gear shaft according to a second embodiment of the invention, and FIG. 5 is a B-B sectional view of the ring gear shaft.

As shown, the power take-off unit ring gear shaft 20 also has an annular shaft wall, the cross sections of which at various axial positions are circular rings. The shaft wall can comprise a support end 21, an input end 22, an intermediate flange 23 or the like that are integrally formed with the shaft wall, and the ways of forming these components comprise but are not limited to machining, press molding, forging and/or casting, etc. As can be seen from the drawings, the shaft wall surrounds a hollow inner cavity which extends throughout the entire gear shaft 20 in an axial direction, and additional shafts may also extend inside the cavity. Four hollow portions 24 are illustratively formed in the shaft wall.

The support end 21 of the gear shaft 20 is adapted to be mounted to a power take-off unit case on the vehicle via a bearing, whereby the gear shaft 20 can rotate inside the power take-off unit. An end of the gear shaft 20 which is opposite to the support end 21 is the input end 22 which is used for receiving power from the transmission box. The intermediate flange 23 which is adapted to fix a bevel gear (not shown) is located between the support end 21 and the input end 22. The bevel gear can output the received power to a rear axle of the vehicle. It can be seen that power is transmitted in a sequence of the transmission box—the input end 22—the intermediate flange 23—the bevel gear—the vehicle rear axle, and the support end 21 serves to support and position and does not bear a very high torque.

According to the illustrated embodiment, hollow portions 24 having an oblong shape can be formed in the shaft wall. The hollow portions 24 are preferably evenly distributed in the circumferential direction in the shaft wall. It can be conceived that under the premise the performance requirements on the ring gear shaft are met, providing these hollow portions in the shaft wall is advantageous for structure optimization, thus realizing a lightweight product. Since a very high torque is not borne between the support end 21 and the intermediate flange 23, the hollow portions 14 are preferably located between the support end and the intermediate flange. If permitted by performance, hollow portions may be also formed at the input end 22 or other positions. It can be understood that in other embodiments, in case that the performance of the ring gear shaft 20 is ensured, the number, shape and arrangement of the hollow portions can be changed. Those skilled in the art will understand that whether the performance design of product meets requirements of working conditions can be verified by finite element calculation.

It can be seen from FIG. 5 that in this embodiment, the inner cavity of the shaft wall of the ring gear shaft 20 is a step-like mold cavity, and the thicknesses of the shaft wall at the support end 21 and the input end 22 are different. Specifically, considering that the input end 22 of the gear shaft 20 has to provide torque transmission, the thickness of the shaft wall at the input end 25b can be larger than that of the shaft wall at the support end 25a. The step-like structure can make the structure lightweight, and meanwhile can increase the space of the inner cavity of the shaft, thus increasing the gap with an inner shaft. The inner cavity structure of the shaft wall can be formed by casting or machining (without being limited thereto), etc. Preferably, the structure can be formed directly by a sand core during casting, and can meet the requirement of minimum gap with the inner shaft without the need for subsequent machining.

More preferably, the ring gear shaft 20 in this embodiment can be manufactured by casting using a spheroidal graphite iron material. For example, the spheroidal graphite iron material can be QT700-10. Using this spheroidal graphite iron material greatly improves the reliability of casting the ring gear shaft. It can be known that in this casting method, a blank of the ring gear shaft can be firstly cast using a sand mold casting process so that the blank has an inner cavity and hollow portions, and then the outer shape of the blank can be machined so that the gear shaft is formed.

FIG. 6 shows a schematic state in which the ring gear shaft in FIGS. 4 and 5 is on a casting core. The solid lines show the casting core 30, and the dashed lines show the ring gear shaft 20.

It can be seen that in this sand molding casting process, a main body part of the core forms an inner cavity of the blank of the ring gear shaft, and a radial extension 31 from the main body of the core forms the hollow portion of the blank of the ring gear shaft. After the blank of the ring gear shaft is removed from the core, the outer shape of the blank is machined so that the gear shaft is formed. The method of manufacturing has a very high production efficiency and a low manufacture cost, thus making it suitable for mass production. Meanwhile, the inner cavity portion and the hollow portions can be formed by one-step casting using a core. In this way, the inner cavity and the hollow portions can be formed without the need for machining, thus improving the production efficiency of machining at a later stage and reducing production cost; sand core casting has a higher accuracy then forging, and can preserve a smaller machining allowance, thus greatly improving the production efficiency of machining and reducing the cost of finished product.

Through the above detailed description of the ring gear shaft or the like, those skilled in the art will conceive an apparatus equipped with the ring gear shaft, which for example comprises but is not limited to a vehicle power take-off unit or a vehicle.

The technical scope of the invention is not merely limited to the above description, and those skilled in the art can make various variations and modifications to the above described embodiments without departing from the technical concept of the invention, and all these variations and modifications should fall into the scope of the invention.

What is claimed is:

1. A power take-off unit ring gear shaft, comprising:
   the gear shaft having an annular shaft wall which surrounds a hollow inner cavity that extends throughout the entire gear shaft in an axial direction, hollow portions being formed in the shaft wall; wherein the gear shaft has a support end that is adapted to be mounted to a power take-off unit case via a bearing, and an intermediate flange that is fixed to a bevel gear, wherein the hollow portions are located between the support end and the intermediate flange.

2. The gear shaft according to claim 1, wherein the hollow portions are evenly distributed in the circumferential direction in the shaft wall.

3. The gear shaft according to claim 1, wherein the inner cavity is a step-like mold cavity.

4. The gear shaft according to claim 3, wherein the gear shaft has an input end that is opposite to the support end, and the thickness of the shaft wall at the input end is larger than that of the shaft wall at the side of the support end.

5. The gear shaft according to claim 1, wherein the gear shaft is made of spheroidal graphite iron material.

6. An apparatus comprising a machine incorporating the gear shaft according to claim 1.

7. The apparatus according to claim 6, wherein the apparatus is a vehicle power take-off unit or a vehicle.

* * * * *